United States Patent [19]

Akrenius

[11] Patent Number: 4,908,909
[45] Date of Patent: Mar. 20, 1990

[54] MEATHAMMER

[75] Inventor: Pyry J. A. Akrenius, Lepsämä, Finland

[73] Assignee: Fendo Oy, Klaukkala, Finland

[21] Appl. No.: 334,140

[22] Filed: Apr. 6, 1989

[51] Int. Cl.$^4$ .............................................. A22C 9/00
[52] U.S. Cl. ........................................ 17/30; 17/25; 173/117; 173/134
[58] Field of Search ................ 17/30, 25, 29; 173/95, 173/112, 123, 117, 134, 125

[56] References Cited

U.S. PATENT DOCUMENTS

| | | | |
|---|---|---|---|
| 2,140,160 | 12/1938 | Little | 17/30 |
| 2,520,032 | 8/1950 | Estes | 17/25 |
| 3,066,350 | 12/1962 | Quiring | 17/25 |
| 3,160,217 | 12/1964 | Raihle | 173/123 |
| 3,892,988 | 7/1975 | Gran | 17/29 |
| 4,742,875 | 5/1988 | Bell | 173/117 |

Primary Examiner—Willis Little
Attorney, Agent, or Firm—Nixon & Vanderhye

[57] ABSTRACT

The meat hammer comprises a handle and a hammer head connected thereto. For facilitating and speeding up the treatment of pieces of meat by automaticing the meat hammer, the body part comprising a cavity is connected to the handle and the piston comprising the hammer head is provided in the cavity for a reciprocating movement. The piston is connected to the eccentric shaft for effecting the reciprocating movement, whereby the eccentric shaft is rotated by the driving means in the handle.

14 Claims, 1 Drawing Sheet

MEATHAMMER

BACKGROUND OF THE INVENTION

The present invention relates to the treatment of pieces of meat, e.g. the preparing of steaks, and, more particularly, to a meat hammer, comprising a handle and a chopping means connected thereto, and by which pieces of meat can be spread and tenderized automatically.

BACKGROUND OF THE INVENTION

Usually the treatment of meat for instance in households, stores, markets, restaurants and such is carried out manually by a conventional meat hammer. When the amount of pieces of meat to be treated is small this work could be considered agreeable, but when the amount increases the work becomes time consuming and physically strenuous. The usually consequences are a deterioration of the quality of the work and particularly the general occurance of injuries to hands and arms due to stress.

On account of the above attempts have earlier been made to develop devices by which the treatment can be carried out automatically. The devices in question have been of a roller-structure. The rollers have been profiled or smooth. The problem with a process of this kind, which could be classified as a mass or serial production, is firstly that the size, consistency as well as the advancing of the spreading and tenderizing of the individual pieces of meat cannot be taken account of. A further problem is constituted by the breaking of the bones and the fibres and the meat sticking to the rollers. Another type of solution has been based upon sharp-edged blade assemblies. This certainly makes the meat tender, but one has to observe that it takes place at the expense of the breaking of the meat fibres, whereby moreover the spreading of the meat is next to nothing.

BRIEF SUMMARY OF THE INVENTION

It is accordingly a primary object of the present invention to provide a meat hammer for the treatment of pieces of meat, e.g. the preparing of steaks, by which meat hammer the above mentioned disadvantages are avoided and a good result of uniform quality, taking the individual pieces of meat into account, is easily and rapidly achieved.

Another object of the present invention is to provide a meat hammer, the construction of which is simple and light, thereby facilitating maintenance and use.

The above mentioned and other objects are achieved in accordance with the meat hammer of the present invention, comprising a handle and a hammer means connected thereto,
said handle having a longitudinal bore for receiving a driving means,
said handle being affixed to a body part provided with a cavity for receiving a piston means, with said hammer means attached thereto, adapted for a reciprocating movement within said cavity,
said reciprocating movement being effected by an eccentric shaft, a rotation of which is provided by the driving means operatively connected to said eccentric shaft and arranged in said longitudinal bore of said shaft.

The fundamental idea of the meat hammer according to the present invention is that the preparing of pieces of meat can be done with the care and precision made possible by manual work, however, in such a manner that the work can be carried out very rapidly without subjecting the person who is performing the task to physical stress and injuries caused by continuous working. The lightness and vibrationless functioning of the meat hammer are the most essential features in this sense. These are implemented by the correct choice of speed of rotation, relation of masses, length of stroke, counterweights, appliance of bearings, materials and counterbalancing of weights. The simple construction of the meat hammer renders it easily maintained and cleaned, which is most beneficial considering durability. Furthermore this is of vital importance judging from a hygienic point of view, which is the most unquestionable criterion in the food industry and which further can be enhanced by an even surfaced configuration of the meat hammer. The simple design of the meat hammer also facilitates its insulation and encasing, which is essential considering safety at work.

In addition the meat hammer is advantageously provided with a replaceable hammer means, whereby it is easily adaptable according to the quality and kind of the meat and the desired final result.

DESCRIPTION OF THE DRAWINGS

The meat hammer of the present invention is described more detailed in the following with reference to the accompanying drawing in which.

DESCRIPTION OF PREFERRED EMBODIMENT

Figure 1:
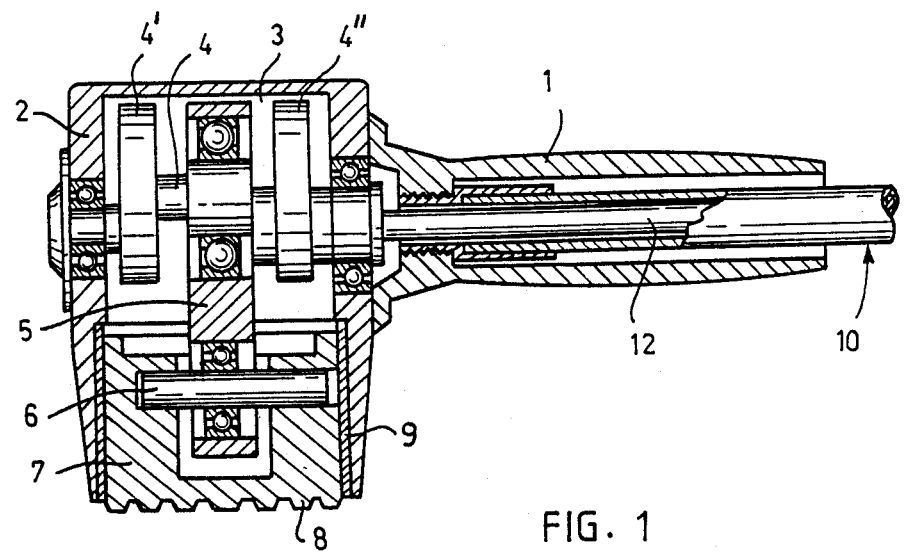
FIG. 1 is an axial sectional view of a preferred embodiment of the meat hammer and FIG. 2 is a side view of the meat hammer coupled to a power source.
Figure 2:
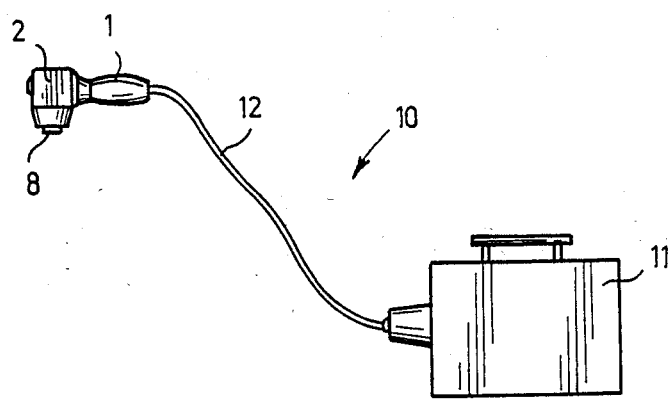

The meat hammer according to the figure comprises a hollow handle 1 and a thereto connected body part 2 provided with a cavity 3 and preferably open only at one end. The cross-section of the body part includind the cavity may be of a rectangular or cylindrical configuration. An eccentric shaft 4 is supported by bearings in the body part 2, the eccentric shaft 4 is preferably in alignment with the hollow shaft 1 of reasons stated later on. A piston-rod 5 is supported by bearings on the eccentric shaft 4, to which piston-rod is fastened, preferably by a detachable key assemblage 6, a piston 7 carrying out a reciprocating movement with a length of stroke determined by the eccentric shaft. The piston 7 comprises a hammer head 8 for treating the meat, the hammer head preferably being detachable and thus exchangeable.

The handle 1 and the eccentric shaft 4 being in alignment relative one another, a driving means 10 provided in the handle is easily connected to the eccentric shaft 4 for attaining the reciprocating movement of the piston. The cavity 2 is provided with a sliding-sleeve 9 at least extending over the area covered by the reciprocating movement of the piston. For counteracting the different forces caused by the piston 7, the piston-rod 5 and the eccentric shaft 4 and for producing a vibration-free stroke performance the eccentric shaft 4 is provided by counter weights 4' and 4" in a manner known per se.

The driving means 10, which in this connection is shown quite schematically, may comprise a motor 11 acting through the handle by means of a wire 12 or an electric motor mounted in the handle. The driving means may also be pneumatic. As switch solutions can be mentioned a switch provided immediately on the handle 1 or a separate pedal switch.

Thus an automatic meat hammer has been provided which almost on its own initiates strokes to a piece of meat. The only measure required is to guide the meat hammer along the piece of meat to be treated, whereby the strokes of the hammer head comprised by the piston can be directed to a desired point and in a desired angle. The surface profile of the exchangeable hammer head may freely be chosen according to the kind and quality of the meat and the desired final result.

The use of the meat hammer can further be facilitated by suspending it by a support/load-lightening spring which can be fastened to a roof, frame or the like, whereby the use of the meat hammer requires practically no force whatsoever.

The structure materials of the meat hammer according to the present invention are in view of maintenance and durability preferably of stainless material. It is evident that other things than meet can be treated with this device.

The drawing and thereto relating specification are only devised for clarifying the idea of the present invention. The device according to the invention can vary in detail in the scope of the attached claims.

What is claimed is:

1. A meat hammer comprising:
   a handle;
   a piston means;
   a hammer means connected to said piston means;
   a driving means for driving said piston and hammer means;
   said handle having means defining a longitudinal bore therein for receiving said driving means, said driving means being operatively disposed in said bore;
   a body part operatively connected to said handle, and means defining a cavity in said body part;
   said piston means, with hammer means attached thereto, being disposed in said cavity and guided for reciprocating movement within said cavity; and
   reciprocating movement effecting means for transforming action of said driving means into reciprocation of said piston means within said cavity, said reciprocating effecting means comprising an eccentric shaft operatively connected to said piston means.

2. The meat hammer of claim 1, wherein said piston means is connected to said eccentric shaft by a piston-rod, whereby the connections between said eccentric shaft and said piston-rod and between said piston-rod and said piston means are provided with bearing means.

3. The meat hammer of claim 1, wherein said cavity in said body part is provided with a sliding sleeve means, which extends at least over an area covered by said reciprocating movement of said piston means.

4. The meat hammer of claim 1, wherein said eccentric shaft is supported at both ends inside said cavity of said body part by bearing means.

5. The meat hammer of claim 1, wherein said hammer means is releasably attached to said piston means.

6. A meat hammer as recited in claim 1 wherein said piston means consists of a single piston and said hammer means consists of a single hammer.

7. A meat hammer as recited in claim 1 wherein said piston means has approximately the same cross-sectional area as said hammer means.

8. A meat hammer as recited in claim 7 wherein said piston means consists of a single piston and said hammer means consists of a single hammer.

9. A meat hammer as recited in claim 1 further comprising counter weights mounted on said eccentric shaft.

10. A meat hammer comprising:
    a main body part with means defining a cavity therein;
    a handle operatively connected to said main body part;
    a piston;
    a drive means disposed in said handle for driving said piston
    means for mounting said piston with said cavity for reciprocation within said cavity;
    an eccentric shaft;
    bearing means for mounting said eccentric shaft within said cavity;
    means for operatively connecting said eccentric shaft to said piston means so that rotation of said eccentric shaft effects reciprocation of said piston; and
    hammer means operatively connected to said piston.

11. A meat hammer as recited in claim 10 wherein said means for connecting said eccentric shaft to said piston comprises a piston rod, bearing means connecting said piston rod to said eccentric shaft, and a key and bearing means operatively connecting said piston rod to said piston, said key being generally parallel to said eccentric shaft.

12. A meat hammer as recited in claim 11 wherein said piston has approximately the same cross-sectional area as said hammer means.

13. A meat hammer as recited in claim 10 wherein said piston has approximately the same cross-sectional area as said hammer means.

14. A meat hammer as recited in claim 10 wherein said piston consists of a single piston and said hammer means consists of a single hammer.

* * * * *